United States Patent
Sato

(10) Patent No.: US 6,711,130 B1
(45) Date of Patent: Mar. 23, 2004

(54) ASYNCHRONOUS TRANSFER MODE DATA TRANSMITTING APPARATUS AND METHOD USED THEREIN

(75) Inventor: Hidenao Sato, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 09/494,920

(22) Filed: Feb. 1, 2000

(30) Foreign Application Priority Data

Feb. 1, 1999 (JP) .......................................... 11-024086

(51) Int. Cl.[7] .......................... H04L 12/56; H04L 29/06
(52) U.S. Cl. ................................. 370/230.1; 370/395.4
(58) Field of Search .............................. 370/230, 230.1, 370/232, 235, 389, 395.1, 395.2, 395.4, 394.43, 399, 409, 412, 468

(56) References Cited

U.S. PATENT DOCUMENTS

| | | | | |
|---|---|---|---|---|
| 5,629,937 A | * | 5/1997 | Hayter et al. | 370/233 |
| 5,748,631 A | * | 5/1998 | Bergantino et al. | 370/398 |
| 6,058,114 A | * | 5/2000 | Sethuram et al. | 370/397 |
| 6,167,049 A | * | 12/2000 | Pei et al. | 370/395 |
| 6,272,109 B1 | * | 8/2001 | Pei et al. | 370/230 |
| 6,408,005 B1 | * | 6/2002 | Fan et al. | 370/412 |
| 6,501,731 B1 | * | 12/2002 | Chong et al. | 370/230.1 |

FOREIGN PATENT DOCUMENTS

| | | |
|---|---|---|
| JP | 8-242238 | 9/1996 |
| JP | 9-149043 | 6/1997 |
| JP | 9-214499 | 8/1997 |
| JP | 10-56492 | 2/1998 |
| JP | 10-135957 | 5/1998 |
| JP | 11-88343 | 3/1999 |
| JP | 11-112525 | 4/1999 |

* cited by examiner

Primary Examiner—Alpus H. Hsu
(74) Attorney, Agent, or Firm—Foley & Lardner

(57) ABSTRACT

An ATM data transmitting apparatus includes a data transmission scheduler and a host controller for giving instructions to the data transmission scheduler, the data transmission scheduler searches a content addressable memory for a data transmission time of a virtual channel equal to a next transmission time to be registered as a data transmission time for another virtual channel so as to schedule the data transmission at different data transmission times through the virtual channels.

7 Claims, 8 Drawing Sheets

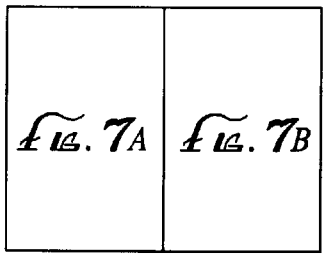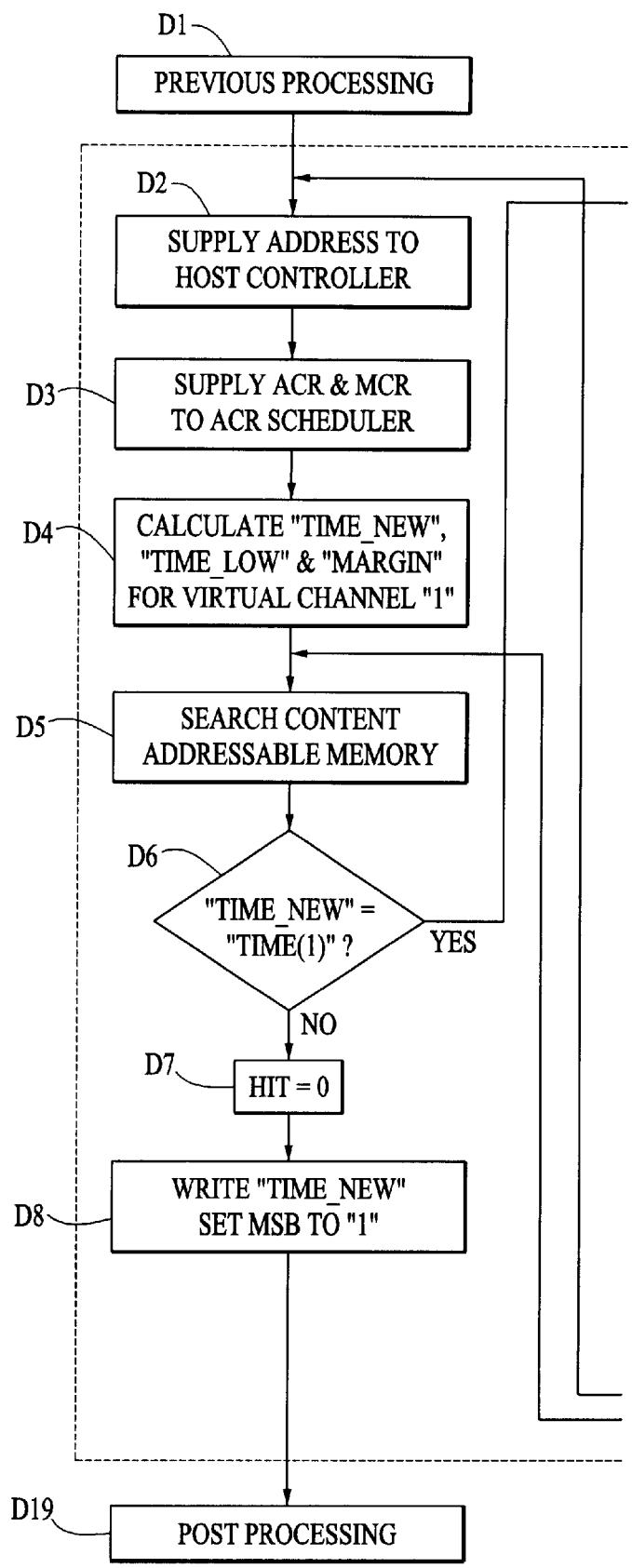

ASYNCHRONOUS TRANSFER MODE DATA TRANSMITTING APPARATUS AND METHOD USED THEREIN

FIELD OF THE INVENTION

This invention relates to an asynchronous transfer mode data communication technology and, more particularly, to an asynchronous transfer mode data transmitting apparatus scheduled in an allowed cell rate and a method used therein.

DESCRIPTION OF THE RELATED ART

An asynchronous transfer mode, which is hereinbelow abbreviated as "ATM", communication has service classes, one of which is called as "available bit rate". When the ATM data communication is controlled under the available bit rate, pieces of input data information are stored in a content addressable memory, and the pieces of data information stored in the content addressable memory are scheduled for data transmission at an optimum transmission rate in the feedback control of congestion status.

It is difficult to apply a hardware and a software designed in the constant bit rate to a data communication in the available bit rate. Japanese Patent Publication of Unexamined Application (laid-open) No. 8-242238 discloses a communication control unit for the ATM data communication, which is applicable to the data communication in the available bit rate. The content addressable memory is incorporated in the prior art communication control unit for scheduling the data transmission. The prior art ATM communication system comprises plural ATM switching units, an ATM server, ATM terminals and an ATM network connected thereto. The prior art communication control unit serves as the ATM server or the ATM terminal.

The ATM communication control unit includes a system bus, which is connected to a system memory for storing transmission data, a host computer and a transmitter-receiver. The transmitter-receiver is connected through a physical device to the ATM network, and is further connected to a control memory. The host computer contains a CPU (Central Processing Unit), and the transmitter-receiver includes a receiving section and a transmitting section both connected through the physical device to the ATM network. The transmitter-receiver further includes a host interface connected to the system bus and a control memory interface connected to the control memory.

FIG. 1 shows a part of the transmitting section of the above-described transmitter-receiver disclosed in the Japanese Patent Publication of Unexamined Application. The prior art transmitting section includes a transmitting controller 40, and the transmission controller 40 is associated with a counter 50 and a content addressable memory section 51. The transmission controller 40 cooperates with the counter 50 and the content addressable memory section 51, and varies the transmission timings depending upon the peak rates of the virtual channels VC. The content addressable memory section 51 includes plural content addressable memory cell arrays 511. When an interrogative data pattern is supplied to the content addressable memory cell arrays 511, the content addressable memory cell arrays 511 compares the interrogative data pattern with stored bit strings to see whether or not any stored bit string is matched with interrogative data pattern. When the content addressable memory cell arrays 511 find a stored bit string matched with the interrogative data pattern, the content addressable memory cell arrays output the address assigned to the memory location where the bit string is stored. The addresses are corresponding to the virtual channels VC, respectively, and a data code stored in each memory location is representative of a time to transmit the next cell to each virtual channel.

The content addressable memory cell arrays 511 are associated with an address decoder 512, a collation register 513 and a selector 516. The transmission controller 40 and the counter 50 are connected to the selector 516, and the selector 516 selectively connects the transmission controller 40 and the counter 50 to the content addressable memory cell arrays 511 under the control of a mode changer 515. The transmission controller 40 instructs the mode changer 515 how to control the selector 516. The collation register 513 is connected through a priority encoder 514 to the transmission controller 40.

The counter 50 increments the stored value at time intervals each equal to a time period required for transmission of a single cell. The stored value is continuously incremented, and, accordingly, is representative of time.

The transmission controller 40 supplies a mode signal to the mode changer 515, and the mode signal is indicative of the write-in mode or the retrieval mode. The mode signal is assumed to indicate the write-in mode. The mode changer 515 controls the selector 516 in such a manner as to connect the transmission controller 40 to the content addressable memory cell arrays 511, and supplies an address signal representative of the memory location corresponding to one of the virtual channels VC. The transmission controller 40 supplies a data code representative of a time (Tp+Ts) to transmit a cell through the selected virtual channel VC through the selector 516 to the content addressable memory cell arrays 511. Then, the data code is stored in the memory location corresponding to the selected virtual channel VC. In this way, data codes are written into the memory locations corresponding to the virtual channels VC.

The transmission controller 40 checks the content addressable memory cell arrays 511 to see whether or not the ATM communication control unit has to transmit a cell through any channel. The transmission controller 40 supplies the mode signal representative of the retrieval mode to the mode changer 515, and causes the selector 516 to connect the counter 50 to the content addressable memory cell arrays 511. The bit pattern representative of the stored value or the present time is supplied through the selector 516 to the content addressable memory cell arrays 511 as the interrogative data pattern. The content addressable memory cell arrays 511 compares the bit pattern with the data codes respectively stored in the memory locations to see whether or not the time to transmit a cell comes. If a data code or data codes are consistent with the bit pattern, logic "1" is written into a memory cell or memory cells of the collation register 513 corresponding to the memory location or the memory locations where the data code or the data codes are stored. If plural data codes are matched with the data pattern, logic "1" is written into the corresponding memory cells, and the priority encoder 514 prioritizes the virtual channels VC, and the address corresponding to the highest priority is transferred to the transmission controller 40.

Japanese Patent Publication of Unexamined Application No. 10-56492 discloses another prior art communication controlling apparatus. FIG. 2 shows the prior art communication controlling apparatus disclosed in the Japanese Patent Publication of Unexamined Application. The prior art communication controlling apparatus comprises a data transmission controller 2 connected to a transmission rate controller 23 and a PCI bus 7, a transmitter 5 connected between the transmission data controller 2 and a cable 13 and a system memory 4 connected to the PCI bus 7. The transmission rate controller 23 manages the timings to transmit cells through plural virtual channels VC.

The transmission rate controller 23 includes a content addressable memory array 25. Plural memory locations are defined in the content addressable memory array 8, and each of the memory locations has an address field 8 and a data field 19. The data field 19 is divided into a data sub-field 21 assigned to a time to transmit a cell and another sub-field 17 assigned to a priority flag. The content addressable memory array 25 is associated with a collation register 27, where results of comparison are stored. A selector 24 is connected between the content addressable memory array 25 and the data transmission controller 2, and selectively transfers the addresses "0" to "15" from the address fields 8 to the data transmission controller 2 depending upon the results of comparison. A timer 3 and a counter 22 generate an interrogative bit pattern representative of a present time and priority, and are connected to the content addressable memory array 25. A write-in controller 6 is further connected to the content addressable memory array 25, and writes a data code representative of a time to transmit a cell into the data sub-field 21 assigned to an associated virtual channel.

The data transmission controller 2 is assumed to check the content addressable memory array 25 to see whether or not a cell is to be transmitted through any one of the virtual channels VC. The timer 3 and the counter 22 supplies the interrogative bit pattern to the content addressable memory array 25, and the interrogative bit pattern is compared with the bit patterns stored in the data fields 19. The present time is assumed to be "06". The counter 22 changes the priority from "00" through "01" to "10". The priority "00" is higher than the priority "01" and the priority "10". Two data fields 19 associated with the addresses "0" and "11" are consistent with the interrogative bit pattern. However, when the counter 22 outputs the priority "00", the data field 19 assigned to the address "11" is consistent with the interrogative bit pattern, and the address "11" is firstly transferred to the data transmission controller 2. The data transmission controller 2 determines the virtual memory corresponding to the address "11", and instructs the transmitter 5 to transfer a cell through the virtual channel.

FIG. 3 shows a data transmission through plural virtual channels VC1/VC2. The virtual channel VC1 has the priority higher than that of the virtual channel VC2. The present time runs as "1", "2", . . . . . . "19" and "20". When the data transmission is scheduled for both virtual channels VC1/VC2, the timer stops incrementing the value (see "5", "11" and "17"). The allowed cell rate for the virtual channel VC1 is ½, and the virtual channel VC1 is expected to pass a cell at every other time. On the other hand, the allowed cell rate for the virtual channel VC2 is ⅓, and the virtual channel VC2 is expected to pass a cell at every third time. The cells are scheduled to be transmitted through the virtual channel VC1 at "1", "3", "5", "7", "9", "11", "13", "15", "17" and "19", and the cells are scheduled to be transmitted through the virtual channel VC2 at "2", "5", "8", "11", "14", "17" and "20". Both virtual channels VC1/VC2 are expected to pass the cells at "5", "11" and "17". This results in that the time intervals between the data transmissions are prolonged from "2" to "3" and from "3" to "4". Thus, the virtual channels VC1/VC2 do not pass the cells at the allowed bit rates at all times. If plural cells are scheduled to be concurrently transmitted through a large number of associated virtual channels, several cells are left in the system memory without the transmission through the associated virtual channels given the priority lower than that of the others. When cells overflow, some cells may be discarded without data transmission.

The minimum cell rate MCR for the virtual channel VC2 is assumed to be ⅓ in the data transmission shown in FIG. 3. The time interval is prolonged over the minimum cell rate at time "5", "11" and "17".

The above-described problems are encountered in both prior arts disclosed in Japanese Patent Publication of Unexamined Application Nos. 8-242238 and 10-56492. The prior art data transmission controllers hardly manage the data transmission through the virtual channels at the allowed cell rate. Sometimes, the prior art data transmission controllers do not achieve the minimum cell rates for the virtual channels. In the worst case, cells are discarded without data transmission.

SUMMARY OF THE INVENTION

It is therefore an important object of the present invention to provide a data transmitting apparatus, which transmits cells through virtual channels in the asynchronous transmission mode without any non-transmitted cell.

It is also an important object of the present invention to provide a method used in the data transmitting apparatus.

In accordance with one aspect of the present invention, there is provided a data transmitting apparatus for transmitting cells through plural virtual channels, the data transmitting apparatus comprises a host controller receiving a request for data transmission and including a memory for storing a first piece of data information representative of an allowed cell rate, a second piece of data information representative of a peak cell rate and a third piece of data information representative of a minimum cell rate for each of the plural virtual channels and an available bit rate scheduler connected to the host controller and including a timer incrementing a present time at intervals each equal to a time period required for transmitting each of the cells, an allowed cell rate scheduler connected to the host controller and the timer and receiving the first piece of data information, the third piece of data information and the present time so as to determine a next transmission time and a time limit for a virtual channel selected from the plural virtual channels, a content addressable memory having plural memory locations respectively storing data transmission times for the plural virtual channels, a retriever connected to the allowed cell rate scheduler, the host controller and the content addressable memory and checking the content addressable memory to see whether or not at least one of the data transmission times is equal to one of the next transmission time and the present time and a write-in controller connected to the retriever and the content addressable memory and writing the next transmission time in one of the memory locations as a data transmission time for the virtual channel when there is not any data transmission time equal to the next transmission time, the write-in controller further writes a time not later than the time limit as a data transmission time when there is a data transmission time equal to the next transmission time, and the host controller outputs the data transmission time equal to the present time so as to transmit a cell through the virtual channel.

In accordance with another aspect of the present invention, there is provided a method for scheduling a data transmission through a virtual channel comprising the steps of a) determining a next transmission time and a time limit for the data transmission on the basis of an allowed cell rate, a minimum cell rate and a present time, b) searching a content addressable memory to see whether any one of data transmission times is equal to the next transmission time and c) writing the next transmission time in the content addressable memory as a data transmission time for the virtual channel when the answer at the step b) is given negative or a time not later than the time limit as a data transmission time when the answer is given affirmative.

BRIEF DESCRIPTION OF THE DRAWINGS

The features and advantages of the ATM data transmitting apparatus and the method will be more clearly understood from the following description taken in conjunction with the accompanying drawings in which.

DESCRIPTION OF THE PREFERRED EMBODIMENTS

First Embodiment

Figure 1:
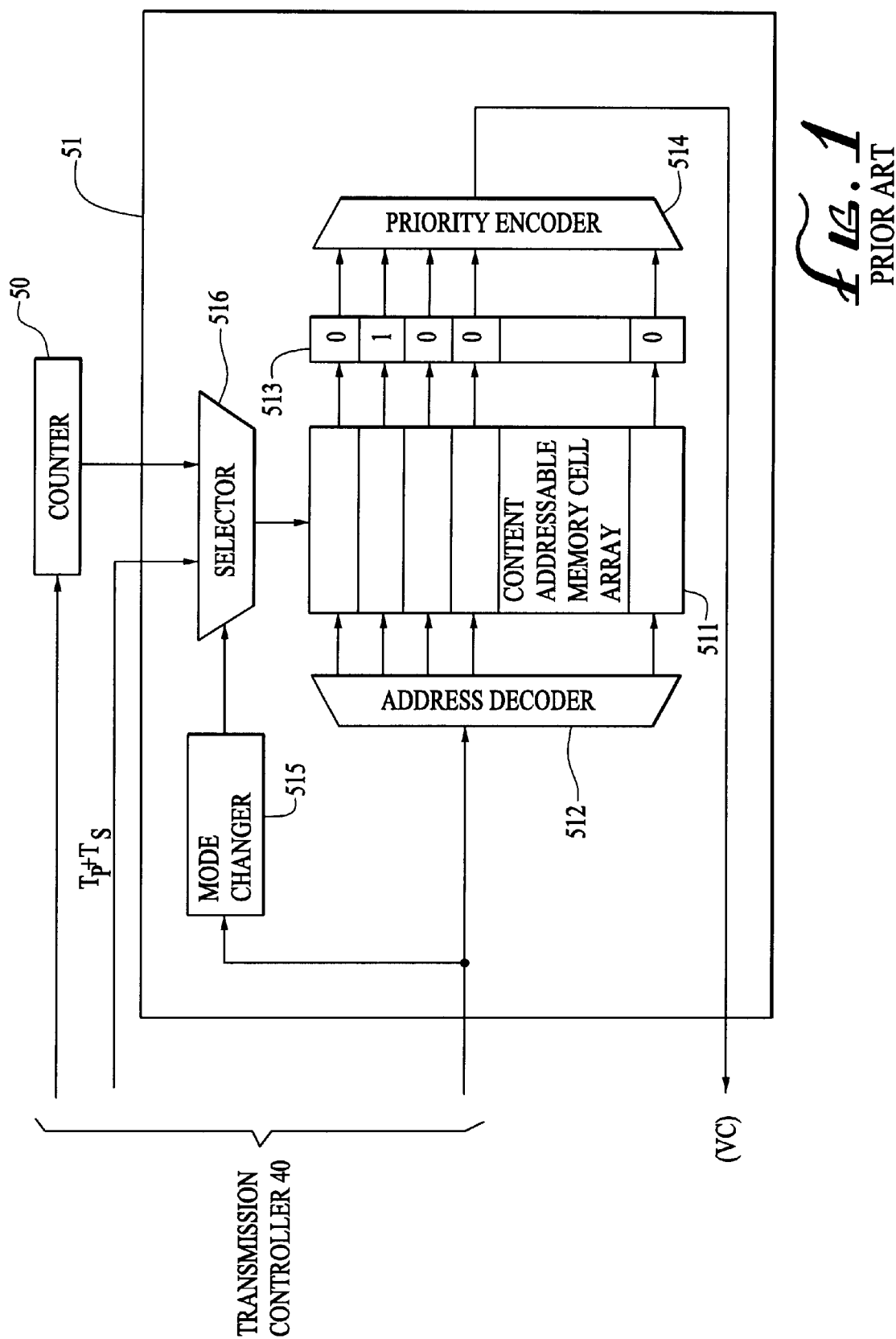
FIG. 1 is a block diagram showing the essential part of the prior art transmitting section disclosed in Japanese Patent Publication of Unexamined Application No. 8-242238.
Figure 2:
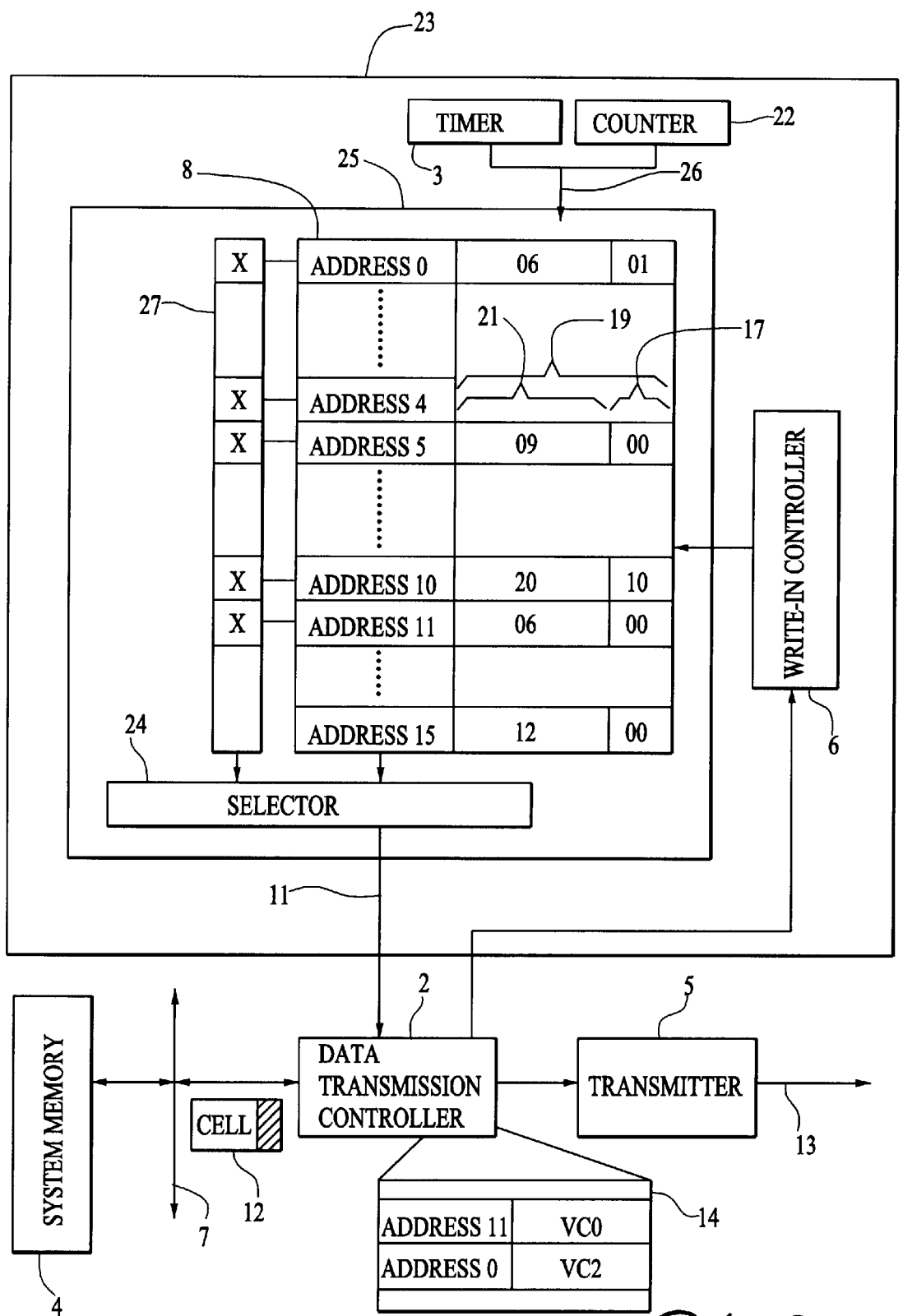
FIG. 2 is a block diagram showing the prior art transmitting control apparatus disclosed in Japanese Patent Publication of Unexamined Application No. 10-56492.
Figure 3:
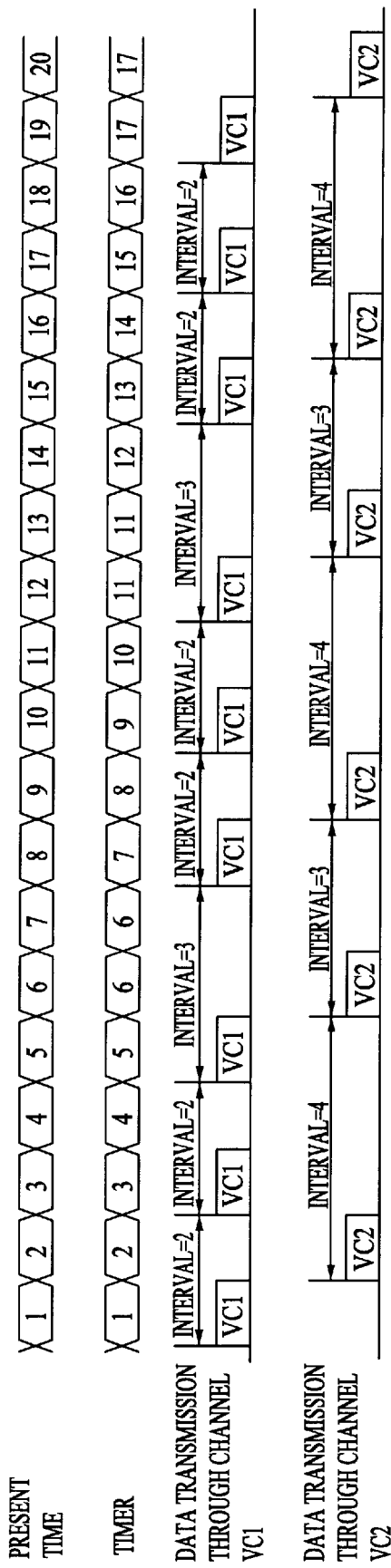
FIG. 3 is a timing chart showing the data transmission in the prior art data transmitting control apparatus.
Figure 4:
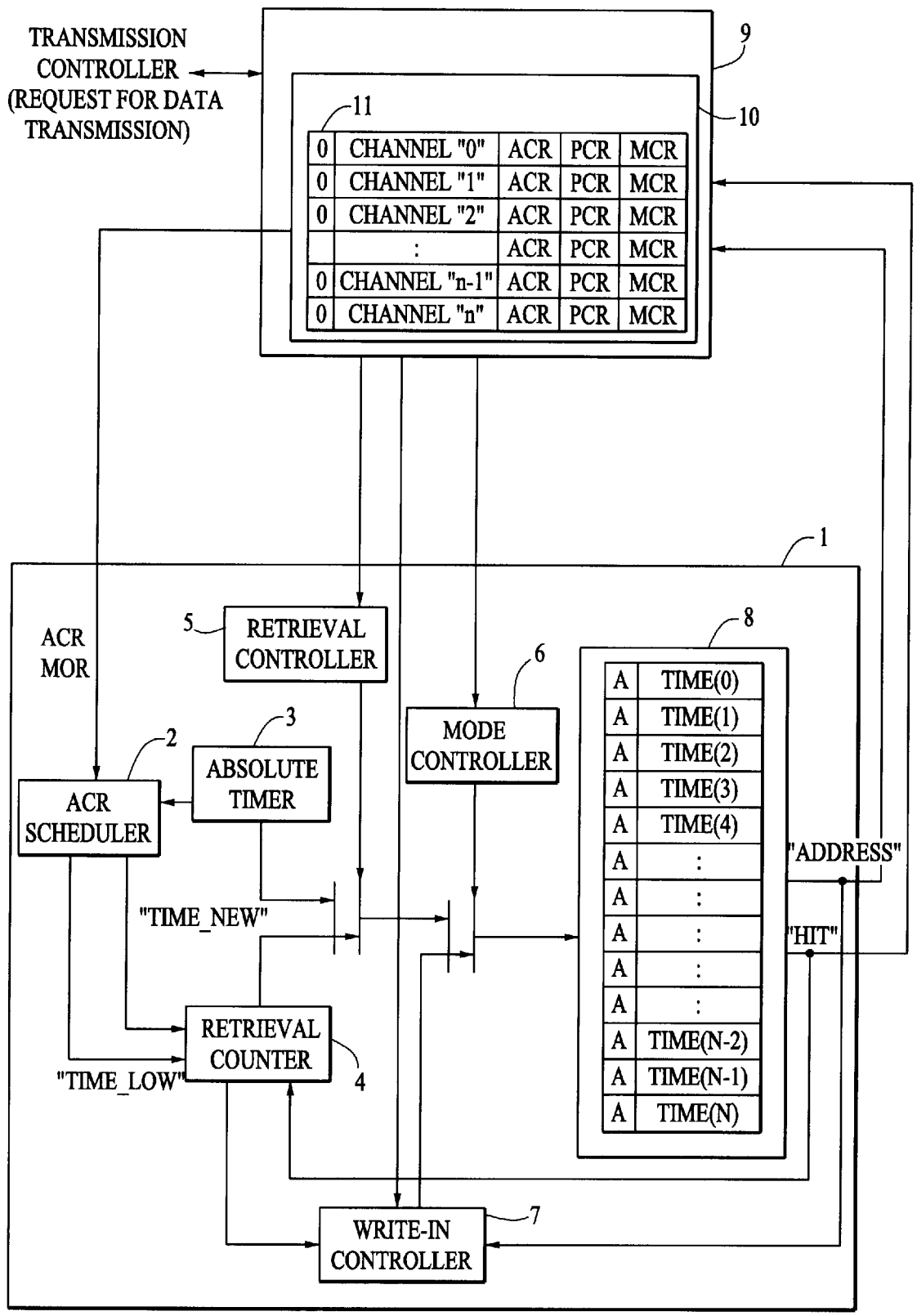
FIG. 4 is a block diagram showing an ATM data transmitting control apparatus according to the present invention.

FIG. 4 illustrates a part of an ATM data transmitting control apparatus embodying the present invention. The ATM data transmitting control apparatus may be corresponding to the transmitter shown in FIG. 3 of Japanese Patent Publication of Unexamined Application No. 8-242238. Japanese Patent Publication of Unexamined Application No. 8-242238 teaches that the transmitter forms a part of the transmitter-receiver, which in turn forms a part of the ATM server or a part of the ATM terminal. The ATM server and the ATM terminals serve as essential components of an ATM communication network system. The part of the ATM data transmitting control apparatus shown in FIG. 3 is corresponding to the part of the prior art transmitter shown in FIG. 1 of the attached drawings, and schedules the data transmission through virtual channels in the available bit rate.

An ABR scheduler or a data transmission scheduler 1 is under the control of a host controller 9. The host controller 9 is connected to a transmission controller corresponding to the transmission controller 40 shown in FIG. 1. The transmission controller supplies a request for data transmission, a request for retrieval and a request for rewriting a next transmission time stored in the data transmission scheduler 1 to the host controller 9, and the host controller 9 controls the rewriting operation and the retrieval. If the data transmission scheduler 1 finds the next transmission time matched with the present time, the data transmission scheduler 1 informs the host controller 9 of the number assigned to the associated virtual channel, and the host controller 9 transfers the number assigned to the associated virtual channel to the communication controller. In this instance, the virtual channels are numbered from "0" to "n".

The host controller 9 has a memory 10, and a table is formed in the memory 10. The memory may be implemented by an array of registers or a random access memory device. The table has plural memory locations respectively assigned to the virtual channels. Each of the memory locations has a data field assigned to pieces of data information representative of an allowed cell rate ACR, a peak cell rate PCR and a minimum cell rate MCR and a flag field assigned to a flag 11 indicative of whether or not a data transmission has been already requested for the associated channel. When the host controller 9 accepts the first request for data transmission through one of the virtual channels, the host controller 9 changes the associated flag from "0" to "1".

The data transmission scheduler 1 includes a content addressable memory 8, and plural memory locations are defined in the content addressable memory 8. Each of the memory locations has an address field assigned an address corresponding to the number of the associated virtual channel and a data field assigned to the data transmission time "0", "1", "2""2", . . . , "N−2", "N−1" and "N". The most significant bit MSB of the data field is used as a flag representative of a free memory location or a memory location already assigned.

The data transmission scheduler 1 further includes an ACR scheduler 2 and an absolute timer 3. The absolute timer 3 stores a value, which is continuously incremented at time intervals each equal to a time period required for a data transmission of a single ATM cell. The value stored in the absolute timer 3 is representative of the present time "tx_time", and is supplied to the ACR scheduler 2. The ACR scheduler 2 is further connected to the host controller 9, and the allowed cell rate ACR and the minimum cell rate MCR are supplied from the host controller 9 to the ACR scheduler 2. The ACR scheduler 2 calculates the next transmission time "time_new" and a time limit "time_low" on the basis of the present time "tx_time", the allowed cell rate ACR and the minimum cell rate MCR. The time limit "time_low" is indicative of a time until which the next ATM cell has to be transmitted.

The ABR scheduler 1 further includes a retrieval counter 4, a first selector, a second selector, a retrieval controller 5, a mode controller 6 and a write-in controller 7. The retrieval counter 4 is connected to the ACR scheduler 2, and the next transmission time "time_new" and the time limit "time_low" are supplied to the retrieval counter 4. The retrieval counter 4 generates an interrogative bit string representative of the next transmission time "time_new" or the time limit "time_low", and supplies the interrogative bit string to the first selector. The retrieval counter 4 is further connected to the write-in controller 7, and supplies the next transmission time "time_new" to the write-in controller 7. The retrieval counter 4 controls data retrieval as will be described hereinlater.

The absolute timer 3 is connected to the first selector, and supplies the present time "tx_time" to the first selector. The first selector selectively transfers the next transmission time "time_new" and the present time "tx_time" to the first selector under the control of the retrieval controller 5. The host controller 9 is connected to the retrieval controller 5, and instructs the retrieval controller 5 which time the first selector is to transfer. The first selector is responsive to the instruction so as to selectively transfer the next transmission time "time_new" and the present time "tx_time" to the second selector. The retrieval counter 4 searches the content addressable memory 8 with the next transmission time "time_new" or the time limit "time_low" for a virtual channel or plural virtual channels as will be described hereinlater. The result of retrieval is supplied from the content addressable memory 8 to the retrieval counter 4 and the host controller 9.

The write-in controller 7 is connected to the second selector, and supplies a piece of address/data information to the second selector. The host controller 9 informs the mode controller 6 that the ABR scheduler 1 is to enter a retrieval mode or a write-in mode. The second selector connects the first selector to the content addressable memory 8 in the retrieval mode, and the next transmission time "time_new" and the present time "tx_time" are selectively transferred through the first selector and the second selector to the content addressable memory 8. On the other hand, the second selector connects the write-in controller 7 to the content addressable memory 8 in the write-in mode, and allows the write-in controller 7 to achieve given jobs as will be described hereinlater.

The write-in controller 7 is under the control of the host controller 9. The retrieval counter 4 supplies the next transmission time "time_new" to the write-in controller 7, and the content addressable memory 8 supplies a hit signal to the retrieval counter 4 and the host controller 9.

Figure 5:
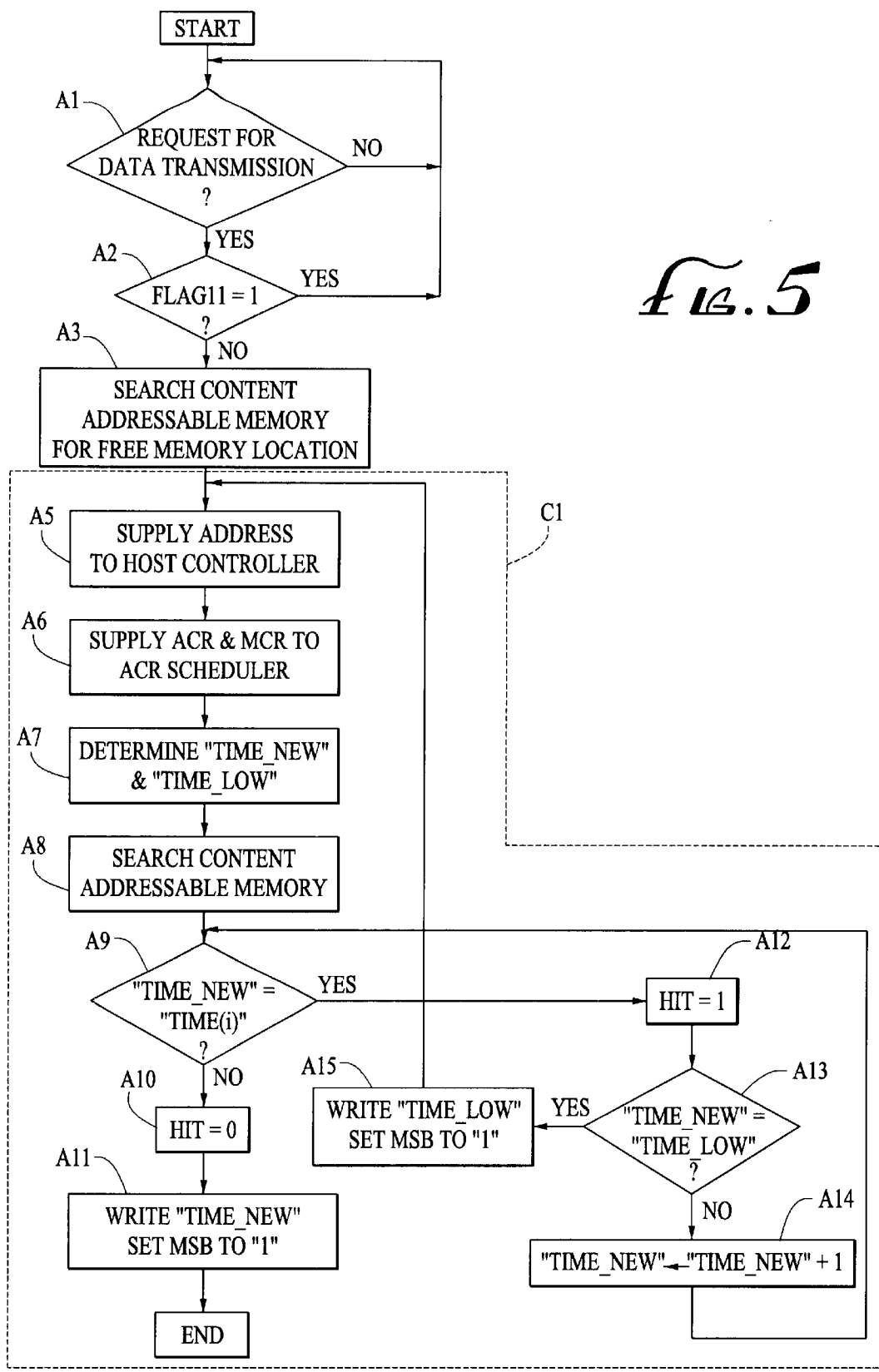
FIG. 5 is a flowchart showing a program for scheduling data transmission.

FIG. 5 shows a program for scheduling data transmission through the virtual channels. The host controller 9 periodically checks a signal input port thereof to see whether or not the request for data transmission arrives at the signal input port as by step A1. If any request for data transmission does not arrives at the signal input port, the host controller 9 repeats step A1.

On the other hand, when the host controller 9 has received the request for data transmission through a certain virtual channel, the host controller 9 checks the flag 11 to see whether or not the request for the data transmission has been already registered as by step A2.

If the data transmission through the certain virtual channel has been already requested before the current request, the flag has been already changed to "1", and the answer at step A2 is given affirmative. Then, the host controller 9 returns to step A1, and monitors the signal input port, again.

On the other hand, if the data transmission through the certain virtual channel has not been requested, yet, the answer at step A2 is given negative. The host controller 9 instructs the write-in controller 7 to search the content addressable memory 8 for a free memory location as by step A3.

The write-in controller 7 masks the data field except the most significant bit MSB, and checks the content addressable memory 8 to see whether or not any memory location is free. When the write-in controller 7 finds the most significant bit MSB of "0", the associated memory location is free, and the host controller 9 receives the address assigned to the free memory location from the content addressable memory 8 as by step A5.

The host controller 9 sets the flag 11 associated with the certain channel to "1", and supplies the allowed cell rate ACR and the minimum cell rate MCR to the ACR scheduler 2 as by step S6.

The ACR scheduler 2 calculates a first time interval and a second time interval on the basis of the allowed cell rate ACR and the minimum cell rate MCR, respectively, and adds the first time interval and the second time interval to the present time "tx_time". The sums represent the next transmission time "time_new" and the time limit "time_low". Thus, the ACR scheduler 2 determines the next transmission time "time_new" and the time limit "time_low" as by step A7.

The host controller 9 has instructed the first selector and the second selector to connect the retrieval counter 4 to the content addressable memory 8. The retrieval counter 4 supplies an interrogative bit string representative of the next transmission time "time_new" for the certain channel to the content addressable memory 8 as by step A8, and the content addressable memory 8 checks the data fields to see whether or not the next transmission time "time_new" is equal to any one of the data transmission times "time (0)" to "time (N)" as by step A9.

If the content addressable memory 8 does not find any data field storing the data transmission time "time (i)" equal to the next transmission time "time_new", the answer at step A9 is given negative, and the content addressable memory 8 keeps the hit signal "hit" in logic "0" as by step A10. The hit signal "hit" of logic "0" is supplied to the host controller 9 and the retrieval counter 4. The host controller 9 instructs the write-in controller 7 to write the next transmission time "time_new" into the data field of the free memory location as the data transmission time and to set the most significant bit MSB to "1". The retrieval counter 4 supplies the next transmission time "time_new" to the write-in controller 7. The write-in controller 7 writes the data transmission time equal to the next transmission time "time_new" into the data field, and sets the flag at the most significant bit MSB to "1" as by step A11.

On the other hand, if the content addressable memory 8 finds a data transmission time "time (i)" equal to the next transmission time "time_new", the answer at step A9 is given affirmative, and the content addressable memory 8 changes the hit signal "hit" to logic "1" level as by step A12. The hit signal "hit" of logic "1" is supplied to the host controller 9 and the retrieval counter 4. The retrieval counter 4 compares the next transmission time "time_new" with the time limit "time_low" to see whether or not the next transmission time "time_new" is equal to the time limit "time_low" as by step A13. While the answer at step A13 is given negative, the retrieval counter 4 increments the next transmission time, i.e., "time_new"+1→"time_new" as by step A14, and returns to step A9. Thus, the retrieval counter A9 increments the next transmission time "time_new", and reiterates the loop consisting of steps A9, A12, A13 and A14. When the answer at step A9 is given negative, the write-in controller 7 writes the next transmission time "time_new" into the data field as the data transmission time (see steps A11). Although the next transmission time "time_new" is incremented to the value equal to the time limit "time_low", the answer at step A9 may be still given affirmative. In this situation, the host controller 9 instructs the write-in controller 7 to write the time limit "time_low" in the data field of the free memory location as the data transmission time and to set the flag MSB to logic "1". The retrieval counter 4 supplies the time limit "time_low" to the write-in controller 7. The write-in controller 7 writes the time limit "time_low" into the data field of the free memory location as the data transmission time, and sets the flag MSB to logic "1" as by step A15.

Upon completion of the job at step A15, the host controller 9 instructs the data transmission scheduler 1 to execute the loop C1 for the virtual channel, which has the data transmission time equal to the time limit "time_low" for the certain virtual channel. The data transmission time is delayed at step A14, and is not overlapped with the data transmission time for the certain virtual channel.

Figure 6:
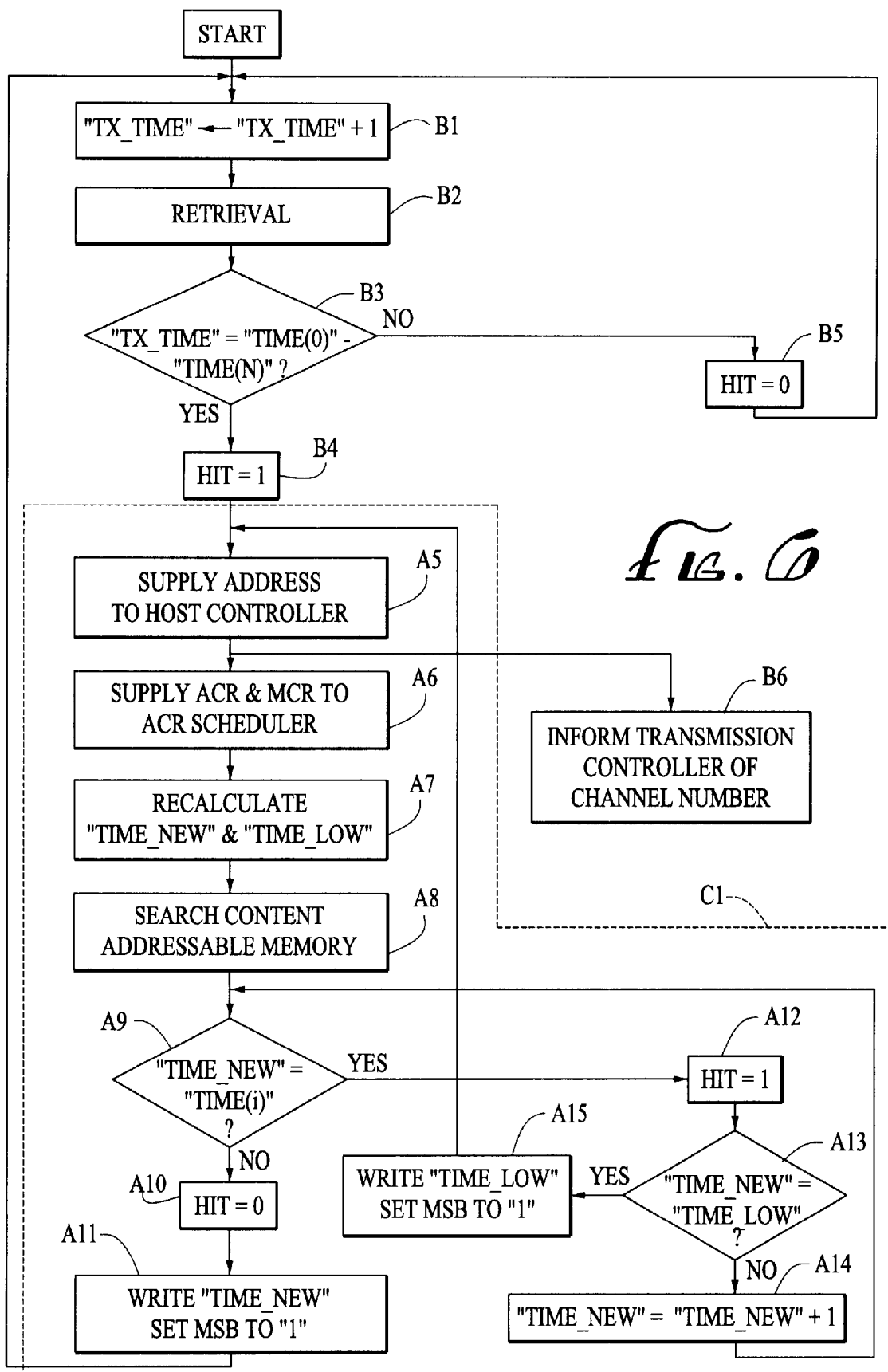
FIG. 6 is a flowchart showing a program for the data transmission.

FIG. 6 shows a program for the data transmission. The absolute counter 3 increments the present time, i.e., "tx_time"←"tx_time"+1 as by step B1, and the host controller 9 instructs the retrieval controller 5 and the mode controller 6 to connect the absolute timer 3 through the first selector and the second selector to the content addressable memory 8 for retrieval with the present time "tx_time" as by step B2. The absolute timer 3 supplies the present time "tx_time" through the first selector and the second selector to the content addressable memory 8, and the content addressable memory 8 checks the data fields to see whether or not any data transmission time is equal to the present time "tx_time" as by step B3. If the content addressable memory 8 does not find any data transmission time equal to the present time "tx_time", the content addressable memory 8 keeps the hit signal "hit" in logic "0" as by step B5, and the control returns to step B1. The control reiterates the loop consisting of steps B1, B2, B3 and B5, and the absolute timer 3 continuously increments the present time "tx_time".

When the content addressable memory 8 finds a data field where the data transmission time is equal to the present time "tx_time", the content addressable memory 8 changes the hit signal "hit" to logic "1" as by step B4, and the control proceeds to the loop C1. The loop C1 is corresponding to the loop C1 in the program shown in FIG. 5.

In detail, the content addressable memory 8 supplies the address associated with the date field where the data transmission time is equal to the present time "tx_time" to the host controller 9 as by step A5. The host controller 9 determines the number assigned to the virtual channel on the basis of the address, and informs the transmission controller of the channel number assigned to the virtual channel as by step B6. Then, the transmission controller transmits an ATM cell through the virtual channel.

In order to recalculate the next transmission time "time_new" and the time limit "time_low" for the virtual channel, the host controller 9 supplies the allowed cell rate ACR and the minimum cell rate MCR to the ACR scheduler 2 as by step A6.

The ACR scheduler 2 recalculates the first time interval and the second time interval on the basis of the allowed cell rate ACR and the minimum cell rate MCR, respectively, and adds the first time interval and the second time interval to the present time "tx_time". The sums represent the next transmission time "time_new" and the time limit "time_low". Thus, the ACR scheduler 2 determines the next transmission time "time_new" and the time limit "time_low" as by step A7 for the next data transmission.

The host controller 9 has instructed the first selector and the second selector to connect the retrieval counter 4 to the content addressable memory 8. The retrieval counter 4 supplies an interrogative bit string representative of the next transmission time "time_new" for the virtual channel to the content addressable memory 8 as by step A8, and the content addressable memory 8 checks the data fields to see whether or not the next transmission time "time_new" is equal to any one of the data transmission times "time (0)" to "time (N)" as by step A9.

If the content addressable memory 8 does not find any data field storing the data transmission time "time (i)" equal to the next transmission time "time_new", the answer at step A9 is given negative, and the content addressable memory 8 keeps the hit signal "hit" in logic "0" as by step A10. The hit signal "hit" of logic "0" is supplied to the host controller 9 and the retrieval counter 4. The host controller 9 instructs the write-in controller 7 to write the next transmission time "time_new" into the data field of the free memory location as the data transmission time and to set the most significant bit MSB to "1". The retrieval counter 4 supplies the next transmission time "time_new" to the write-in controller 7. The write-in controller 7 writes the data transmission time equal to the next transmission time "time_new" into the data field, and sets the flag at the most significant bit MSB to "1" as by step A11.

On the other hand, if the content addressable memory 8 finds a data transmission time "time (i)" equal to the next transmission time "time_new", the answer at step A9 is given affirmative, and the content addressable memory 8 changes the hit signal "hit" to logic "1" level as by step A12. The hit signal "hit" of logic "1" is supplied to the host controller 9 and the retrieval counter 4. The retrieval counter 4 compares the next transmission time "time_new" with the time limit "time_low" to see whether or not the next transmission time "time_new" is equal to the time limit "time_low" as by step A13.

While the answer at step A13 is given negative, the retrieval counter 4 increments the next transmission time, i.e., "time_new"+1→"time_new" as by step A14, and returns to step A9. Thus, the retrieval counter A9 increments the next transmission time "time_new", and reiterates the loop consisting of steps A9, A12, A13 and A14. When the answer at step A9 is given negative, the write-in controller 7 writes the next transmission time "time_new" into the data field as the data transmission time (see steps A11).

Although the next transmission time "time_new" is incremented to the value equal to the time limit "time_low", the answer at step A9 may be still given affirmative. In this situation, the host controller 9 instructs the write-in controller 7 to write the time limit "time_low" in the data field of the free memory location as the data transmission time and to set the flag MSB to logic "1". The retrieval counter 4 supplies the time limit "time_low" to the write-in controller 7. The write-in controller 7 writes the time limit "time_low" into the data field of the free memory location as the data transmission time, and sets the flag MSB to logic "1" as by step A15.

Upon completion of the job at step A15, the host controller 9 instructs the data transmission scheduler 1 to execute the loop C1 for the virtual channel, which has the data transmission time equal to the time limit "time_low". The data transmission time is delayed at step A14, and is not overlapped with the data transmission time for the virtual channel.

As will be understood from the foregoing description, the data transmission scheduler 1 according to the present invention searches the content addressable memory 8 for a data transmission time "time (0)" to "time (N)" equal to the next transmission time "time_new" or the other data transmission time, and defers the next transmission time "time_new" or the data transmission time by one, if any. As a result, the data transmission is never scheduled at a certain time for plural virtual channels.

Moreover, when the next transmission time "time_new" reaches the time limit "time_low", the data transmission scheduler 1 registers the time limit "time_low" in the content addressable memory 8 as the data transmission time. This results in that the data transmission controller achieves at least the minimum cell rate MCR.

In the above-described embodiment, the retrieval counter 4, the first selector, the second selector, the retrieval controller 5 and the mode controller 6 as a whole constitute a retriever.

Second Embodiment

Figure 7B:
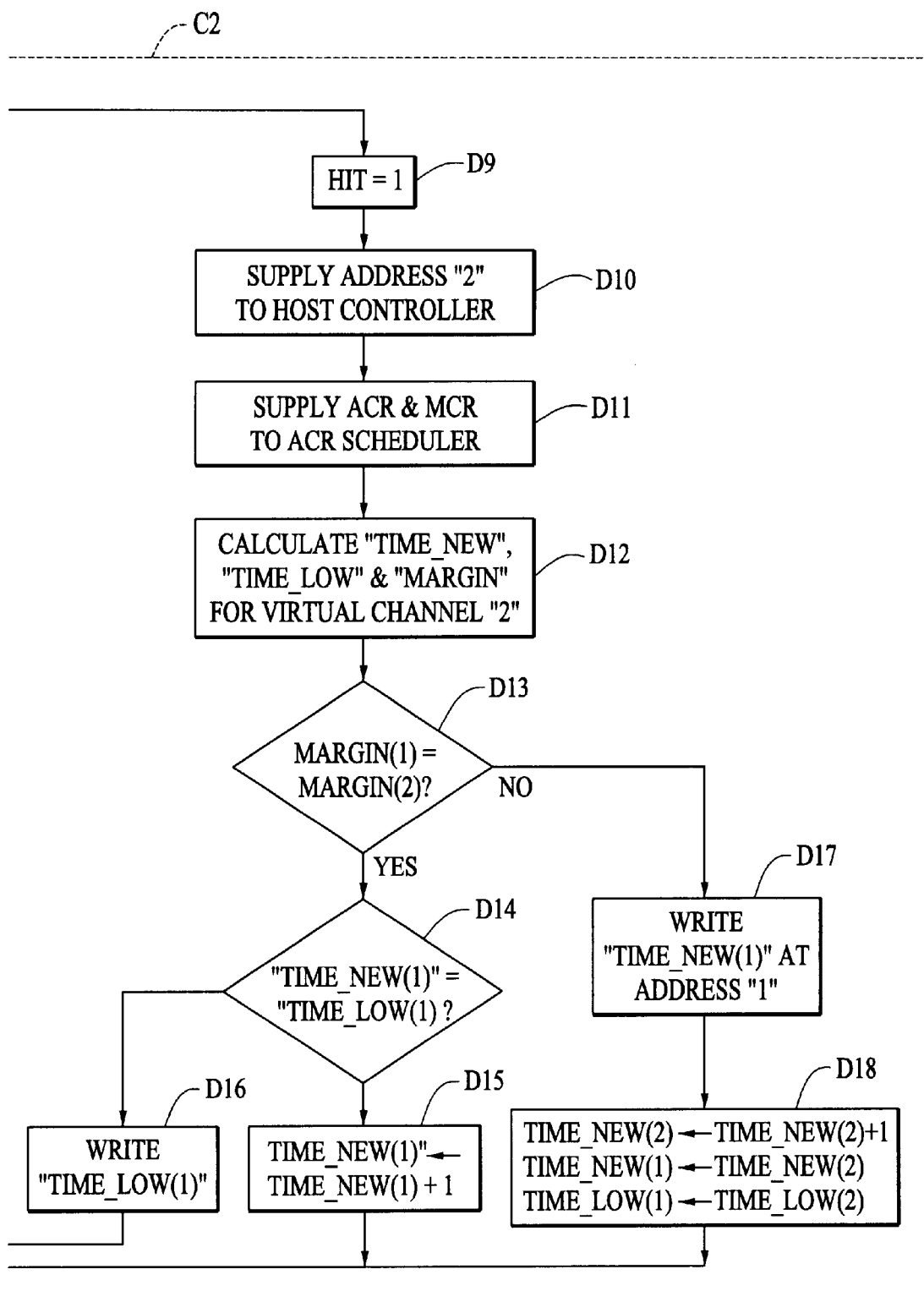
FIG. 7 is a flowchart showing a loop incorporated in programs executed by another ATM data transmission control apparatus according to the present invention.

FIG. 7 shows a loop C2 corresponding to the loop C1 in FIGS. 5 and 6. This means that a previous processing D1 is equivalent to steps A1, A2 and A3 for the scheduling and steps B1, B2, B3 and B4 for the data transmission. The program for the data transmission further includes step B5 as similar to the program shown in FIG. 6.

Upon completion of the job at step A3 or B4, the content addressable memory 8 supplies the address to the host controller 9 as by step D2. The address is assigned to a free memory location in the scheduling program, and is assigned to the memory location where the data transmission time is equal to the present time "tx_time" in the data transmission program. In the following description, the address and the virtual channel are labeled with "1".

Subsequently, the host controller 9 specifies the virtual channel "1", and supplies the allowed cell rate ACR1 of the virtual channel "1" and the minimum cell rate MCR1 of the virtual channel "1" to the ACR scheduler 2 s by step D3. The ACR scheduler 2 calculates the first time interval and the second time interval on the basis of the allowed cell rate ACR1 and the minimum cell rate MCR1, and adds the first time interval and the second time interval to the present time "tx_time". The ACR scheduler 2 determines the sums to be the next transmission time "time_new (1)" and the time limit "time_low (1)". The ACR scheduler 2 subtracts the next transmission time "time_new (1)" from the time limit "time_low (1)". The difference represents a rate margin "margin (1)". Thus, the ACR scheduler 2 determines the next transmission time "time_new (1)", the time limit "time_low (1)" and the rate margin "margin (1)" as by step D4.

Subsequently, the ACR scheduler 2 supplies the next transmission time "time_new (1)" to the retrieval counter 4, and the host controller 9 instructs the retrieval controller 5 and the mode controller 6 to connect the retrieval counter 4 through the first selector and the second selector to the content addressable memory 8 for searching the content addressable memory 8 as by step D5. The content addressable memory 8 checks the data fields to see whether or not any one of the data transmission times "time (0)" to "time (N)" is equal to the next transmission time "time_new (1)" as by step D6.

If all the data transmission times "time (0)" to "time(N)" are different from the next transmission time "time_new", the answer at step D6 is given negative. The content addressable memory 8 keeps the hit signal "hit" in logic "0" as by step D7, and the hit signal "hit" is transferred to the host controller 9 and the retrieval counter 4. The retrieval counter 4 supplies the next transmission time "time_new (1)" to the write-in controller 7, and the host controller 9 instructs the write-in controller 7 to write the next transmission time "time_new (1)" into the memory location assigned the address "1". The write-in controller writes the next transmission time "time_new (1)" into the memory location assigned the address "1", and set the flag MSB to logic "1" as by step D8. Upon completion of the job at step D8, a post processing is carried out as by step D19.

On the other hand, if the content addressable memory 8 finds a data transmission time "time (i)" equal to the next transmission time "time_new (1)", the answer at step D6 is given affirmative, and the content addressable memory 8 changes the hit signal "hit" to logic "1" as by step D9. The data transmission time "time (i)" is assumed to be "time (2)". The content addressable memory 8 determines that the address "2" is assigned to the memory location where the data transmission time "time (2)" is stored, and supplies the address "2" to the host controller 9 as by step D10. The address "2" is assumed to be corresponding to the virtual channel "2". The host controller 9 supplies the allowed cell rate ACR2 of the virtual channel "2" and the minimum cell rate MCR2 of the virtual channel "2" to the ACR scheduler 2 as by step D11. The ACR scheduler 2 calculates the first time interval and the second time interval on the basis of the allowed cell rate ACR2 and the minimum cell rate MCR2, and determines the next transmission time "time_new (2)", the time limit "time_low (2)" and the rate margin "margin (2)" for the virtual channel "2" as by step D12.

The rate margin "margin (1)" is compared with the rate margin "margin (2)" to see whether or not the rate margin "margin (1) is equal to or greater than the rate margin "margin (2)" as by step D13. If the answer at step D13 is affirmative, the host controller 9 instructs the retrieval counter 4 and the write-in counter 7 to carry out the jobs similar to those at steps A13, A14 and A15 as by step D14, D15 and D16.

On the other hand, if the rate margin "margin (2)" is greater than the rate margin "margin (1)", the answer at step D13 is given negative, and the host controller 9 instructs the write-in controller 7 to write the next transmission time "time_new (1)" into the memory location assigned the address "1" for the virtual memory "1" as by step D17.

Subsequently, the next transmission time "time_new (2)" is delayed by one, and the next transmission time "time_new (2)" and the time limit "time_low (2)" are respectively stored as the next transmission time "time_new (1)" and the time limit "time_low (1)" as by step D18.

The control returns to step D5, and the retrieval counter 4 searches the content addressable memory 8 for a data transmission time equal to the next transmission time "time_new (1)", which in turn is equal to the next transmission time "time_new (2)" delayed at step D18. Thus, the data transmission through the virtual channel "2" is scheduled, again.

The data scheduler 1 of the first embodiment delays the next transmission time "time_new" at the allowed cell rate ACR to the time limit at the minimum cell rate MCR for the data transmission through every virtual channel. On the other hand, when the data transmission is scheduled through plural virtual channel, the data scheduler 1 of the second embodiment checks the rate margin to see which virtual channel has a large rate margin. The data transmission scheduler 1 delays the data transmission time for the virtual channel with the large rate margin. The scheduling of the second embodiment is desirable for the data transmission where the minimum cell rate MCR is close to the allowed cell rate ACR.

As will be appreciated from the foregoing description, the data transmission scheduler 1 determines the data transmission time in such a manner that the data transmission time is never overlapped with another data transmission time already registered in the content addressable memory 8. As a result, the data transmission is never scheduled concurrently through plural virtual channels, and ATM cells are transmitted through all the virtual channels at the allowed cell rates. This means that ATM cells are transmitted through the virtual channel with a low priority. The priority encoder 514 is never required for the data transmission scheduler according to the present invention, and the data transmission scheduler is simplified.

Although particular embodiments of the present invention have been shown and described, it will be apparent to those skilled in the art that various changes and modifications may be made without departing from the spirit and scope of the present invention.

For example, the host controller 9 may form a part of the transmission controller communicable with a data transmission controller through a bus system. In this instance, the data transmission controller supplies an instruction representative of a request for data transmission to the transmission controller, and the host controller 9 of the transmission controller manages the data transmission schedule as similar to the embodiment described hereinbefore.

What is claimed is:

1. A data transmitting apparatus for transmitting cells through plural virtual channels, comprising:

a host controller receiving a request for data transmission, and including a memory for storing a first piece of data information representative of an allowed cell rate, a second piece of data information representative of a peak cell rate and a third piece of data information representative of a minimum cell rate for each of said plural virtual channels; and an available bit rate scheduler connected to said host controller, and including a timer incrementing a present time at intervals each equal to a time period required for transmitting each of said cells, an allowed cell rate scheduler connected to said host controller and said timer and receiving said first piece of data information, said third piece of data information and said present time so as to determine a next transmission time and a time limit for a virtual channel selected from said plural virtual channels, a content addressable memory having plural memory locations respectively storing data transmission times for said plural virtual channels, a retriever connected to said allowed cell rate scheduler, said host controller and said content addressable memory and checking said content addressable memory to see whether or not at least one of said data transmission times is equal to one of said next transmission time and said present time, and a write-in controller connected to said retriever and said content addressable memory and writing said next transmission time in one of said memory locations as a data transmission time when there is not any data transmission time equal to said next transmission time, said write-in controller further writing a time not later than said time limit as a data transmission time when there is a data transmission time equal to said next transmission time, said host controller outputting the data transmission time equal to said present time so as to transmit a cell through said virtual channel.

2. The data transmitting apparatus as set forth in claim 1, in which said allowed cell rate scheduler determines a first sum between a first time interval and said present time and a second sum between a second time interval and said present time to be said next transmission time and said time limit, and said first time interval and said second time interval are calculated on the basis of said allowed cell rate and said minimum cell rate.

3. The data transmission apparatus as set forth in claim 1, in which said time is written into said one of said memory locations for said virtual channel.

4. The data transmitting apparatus as set forth in claim 1, in which said allowed cell rate scheduler further determines a rate margin equal to a difference between said next transmission time and said time limit, and said write-in controller writes said time as the data transmission time for one of said virtual channel and another virtual channel found by said retriever after comparison between the rate margin of said virtual channel and the rate margin of said another virtual channel.

5. A method for scheduling a data transmission through a virtual channel, comprising the steps of:

a) determining a next transmission time and a time limit for said data transmission on the basis of an allowed cell rate, a minimum cell rate and a present time;

b) searching a content addressable memory to see whether any one of data transmission times is equal to said next transmission time; and c) writing said next transmission time in said content addressable memory as a data transmission time for said virtual channel when the answer at said step b) is negative or a time not later than said time limit as a data transmission time when said answer is affirmative;

wherein a rate margin representative of a difference between said next transmission time and said time limit is further determined at said step a), and said time is stored in said content addressable memory as a data transmission time for one of said virtual channel and another virtual channel having a data transmission time equal to said next transmission time, said one of said virtual channel and said another virtual channel having the rate margin larger than the rate margin of the other of said virtual channel and said another virtual channel.

6. The method as set forth in claim 5, in which said time is delayed from said next transmission time by a time equal to an interval to be required for transmitting a cell through said virtual channel.

7. The method as set forth in claim 5, in which said time is stored in said content addressable memory as said data transmission time for said virtual channel.

* * * * *